(12) United States Patent
Army

(10) Patent No.: US 10,914,537 B2
(45) Date of Patent: Feb. 9, 2021

(54) HEAT EXCHANGER WITH SPRAY NOZZLE

(71) Applicant: Hamilton Sundstrand Corporation, Windsor Locks, CT (US)

(72) Inventor: Donald E. Army, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 341 days.

(21) Appl. No.: 15/837,320

(22) Filed: Dec. 11, 2017

(65) Prior Publication Data
US 2019/0178588 A1 Jun. 13, 2019

(51) Int. Cl.
| F28F 9/00 | (2006.01) |
| F28F 9/02 | (2006.01) |
| F28D 5/00 | (2006.01) |
| F28D 7/00 | (2006.01) |
| B64D 13/06 | (2006.01) |
| B33Y 80/00 | (2015.01) |

(52) U.S. Cl.
CPC .............. *F28F 9/0282* (2013.01); *F28D 5/00* (2013.01); *F28D 7/0066* (2013.01); *F28F 9/0263* (2013.01); *B33Y 80/00* (2014.12); *B64D 2013/0603* (2013.01); *B64D 2013/0618* (2013.01); *F28F 2009/0292* (2013.01)

(58) Field of Classification Search
CPC .... B64D 2013/0603; B64D 2013/0618; F28D 5/00; F28D 7/0066; F28F 9/0282; F28F 9/0263; F28F 2009/0292; B33Y 80/00
USPC .............. 261/127, 152, 156, 157, 28, 37, 76
See application file for complete search history.

(56) References Cited

U.S. PATENT DOCUMENTS

| 3,878,692 | A | * | 4/1975 | Steves | ..................... | B64D 13/06 62/87 |
| 4,829,775 | A | * | 5/1989 | Defrancesco | .......... | B64D 13/06 62/402 |
| 5,444,991 | A | | 8/1995 | Cox | | |
| 5,461,882 | A | | 10/1995 | Zywiak | | |
| 6,519,969 | B2 | * | 2/2003 | Sauterleute | ............ | B64D 13/06 62/401 |
| 6,883,335 | B2 | * | 4/2005 | Axe | ....................... | B64D 13/06 62/401 |
| 7,334,423 | B2 | * | 2/2008 | Bruno | ..................... | B64D 13/06 62/402 |

(Continued)

FOREIGN PATENT DOCUMENTS

| EP | 2383185 A2 | 11/2011 |
| EP | 2478969 | 7/2012 |

(Continued)

OTHER PUBLICATIONS

European Search Report for European Application No. 18211631.9, dated Mar. 25, 2019.

*Primary Examiner* — Charles S Bushey
(74) *Attorney, Agent, or Firm* — Carlson, Gaskey & Olds, P.C.

(57) ABSTRACT

An environmental control system according to an example of the present disclosure includes a heat exchanger, a ram air duct operable to provide cooling ram air to the heat exchanger, and a water extractor operable to extract water from a bleed air stream. The heat exchanger includes at least one nozzle operable to spray water from the water extractor into the ram air duct. An example heat exchanger and a method of making a heat exchanger are also disclosed.

9 Claims, 4 Drawing Sheets

(56) References Cited

U.S. PATENT DOCUMENTS

| | | | | |
|---|---|---|---|---|
| 7,797,962 | B2* | 9/2010 | Kresser | B64D 13/06 62/401 |
| 9,200,855 | B2 | 12/2015 | Kington et al. | |
| 10,457,399 | B2* | 10/2019 | Bammann | B64D 13/06 |
| 10,493,820 | B2* | 12/2019 | Frieling | B64D 13/08 |
| 2004/0211208 | A1 | 10/2004 | Permetti | |
| 2011/0259546 | A1* | 10/2011 | DeFrancesco | B64D 13/00 165/42 |
| 2012/0152501 | A1 | 6/2012 | Harvey et al. | |
| 2015/0121909 | A1* | 5/2015 | Koenig | B64D 13/06 62/61 |
| 2016/0178285 | A1* | 6/2016 | Pal | B64D 13/06 165/104.19 |
| 2017/0152050 | A1* | 6/2017 | Klimpel | F25B 13/00 |
| 2017/0205145 | A1 | 7/2017 | Manteiga et al. | |

FOREIGN PATENT DOCUMENTS

| | | |
|---|---|---|
| EP | 2868579 A1 | 5/2015 |
| EP | 3444550 | 2/2019 |
| GB | 588062 A | 6/1947 |
| WO | 2016037232 A1 | 3/2016 |

\* cited by examiner

HEAT EXCHANGER WITH SPRAY NOZZLE

BACKGROUND

Environmental Control Systems (ECS) provide air supply, thermal control, and cabin pressurization for an aircraft. ECS can also provide avionics cooling, smoke detection, fire suppression, or other functions. ECS systems typically receive bleed air from an aircraft engine, and cool the bleed air with an air-conditioning "pack." The pack is cooled by ram (outside) air from a ram air duct.

However, ambient air can have high humidity. In order to avoid sending humid air to the aircraft cabin, the bleed air is dehumidified. Free water collects in a system water extractor in the ECS. The water is then directed to one more spray nozzles arranged in the ram air duct, typically on a cold side of the ram air duct inlet header. The spray nozzles spray water droplets into the ram air stream, and the water droplets evaporate. The evaporation process provides additional cooling for air that is ultimately sent to the aircraft cabin.

SUMMARY

An environmental control system according to an example of the present disclosure includes a heat exchanger, a ram air duct operable to provide cooling ram air to the heat exchanger, and a water extractor operable to extract water from the bleed air. The heat exchanger includes at least one nozzle operable to spray water from the water extractor into the ram air duct.

In a further embodiment according to the foregoing embodiment, at least one nozzle is arranged along a pipe in fluid communication with the water extractor.

In a further embodiment according to any of the foregoing embodiments, the pipe is located along a cold side of the heat exchanger, the cold side of the heat exchanger facing the ram air duct.

In a further embodiment according to any of the foregoing embodiments, the pipe is inside the heat exchanger.

In a further embodiment according to any of the foregoing embodiments, at least one nozzle extends from the pipe through the cold side of the heat exchanger.

In a further embodiment according to any of the foregoing embodiments, at least one nozzle includes an orifice for spraying the water, and the orifice is exterior to the heat exchanger.

In a further embodiment according to any of the foregoing embodiments, at least one nozzle comprises a plurality of nozzles, and the plurality of nozzles are equidistant from one another.

In a further embodiment according to any of the foregoing embodiments, at least one nozzle comprises a plurality of nozzles, and the plurality of nozzles are equidistant from a top edge of the cold side of the heat exchanger.

In a further embodiment according to any of the foregoing embodiments, at least one nozzle comprises a plurality of nozzles, and the plurality of nozzles are arranged in a straight line.

In a further embodiment according to any of the foregoing embodiments, the heat exchanger is operable to provide conditioned air for an aircraft cabin.

In a further embodiment according to any of the foregoing embodiments, the heat exchanger is a plate-and-fin heat exchanger.

In a further embodiment according to any of the foregoing embodiments, the at least one nozzle is one of a fixed orifice nozzle and a pintle nozzle.

A heat exchanger system according to an example of the present disclosure includes a cold side, a pipe arranged along the cold side, and at least one nozzle. The at least one nozzle is arranged along the pipe and extends through the cold side. The pipe and the at least one nozzle are integral with the heat exchanger.

In a further embodiment according to any of the foregoing embodiments, at least one nozzle is operable to spray water to an exterior of the cold side.

In a further embodiment according to any of the foregoing embodiments, the at least one nozzle extends from the pipe through the cold side of the heat exchanger.

In a further embodiment according to any of the foregoing embodiments, at least one nozzle comprises a plurality of nozzles, and the plurality of nozzles are equidistant from one another.

In a further embodiment according to any of the foregoing embodiments, at least one nozzle comprises a plurality of nozzles, and the plurality of nozzles are equidistant from a top edge of the cold side.

In a further embodiment according to any of the foregoing embodiments, at least one nozzle comprises a plurality of nozzles, and the plurality of nozzles are arranged in a straight line.

A method of making a heat exchanger according to an example of the present disclosure includes forming a heat exchanger, and forming a pipe along a side of the heat exchanger and at least one nozzle along the pipe, and extending through the side of the heat exchanger. The pipe and the at least one nozzle are formed integrally with the heat exchanger as the heat exchanger is being formed.

In a further embodiment according to any of the foregoing embodiments, the forming is done by additive manufacturing.

DETAILED DESCRIPTION

Figure 1:
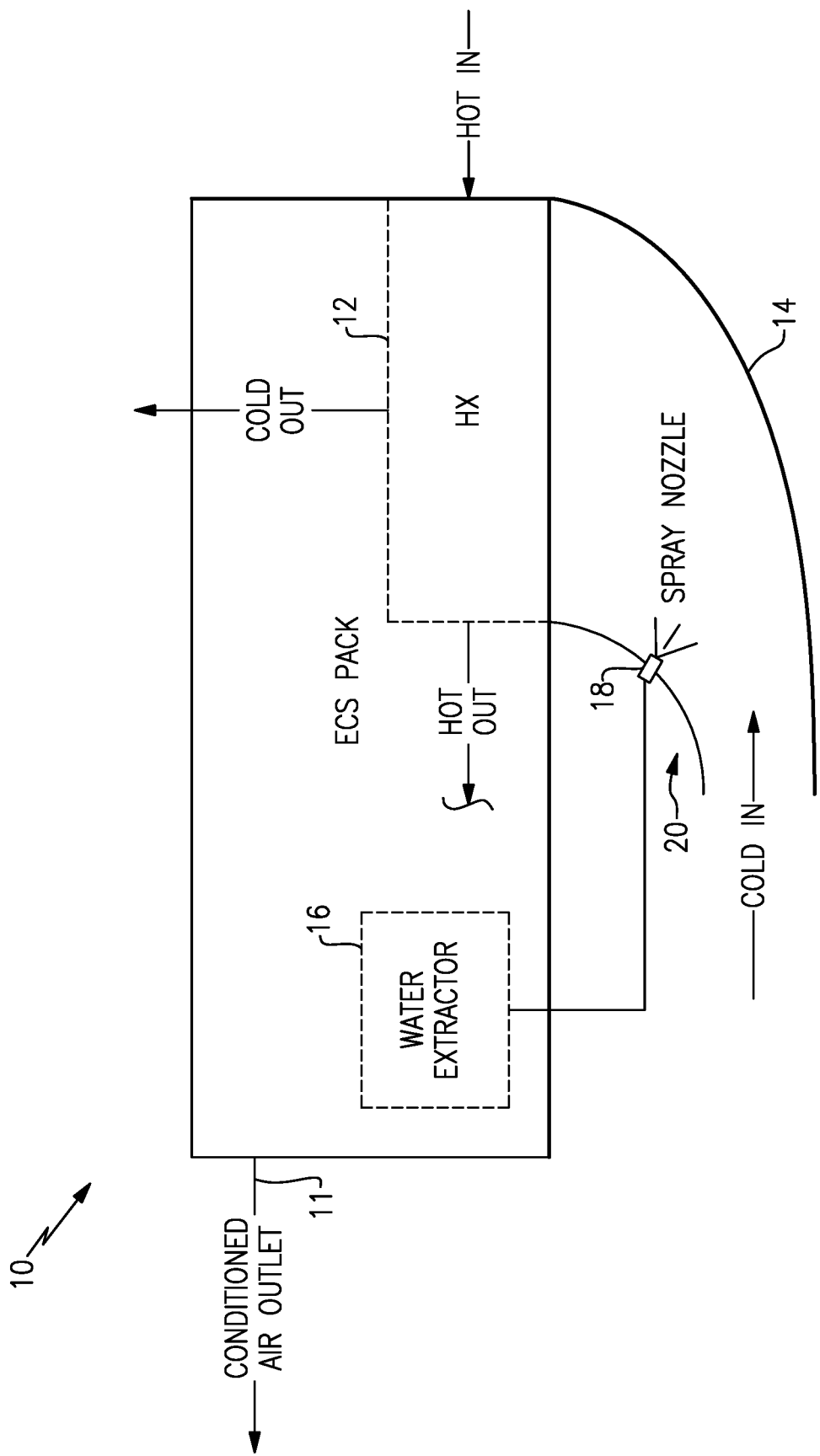
FIG. 1 schematically illustrates a prior art environmental control system (ECS).

FIG. 1 schematically illustrates a prior art environmental control system (ECS) 10 for an aircraft. The ECS 10 provides conditioned air at a desired temperature and pressure to an aircraft cabin via a conditioned air outlet 11. The ECS includes a heat exchanger 12, which receives hot air and cools the hot air. The hot air can be bleed air from an aircraft engine (not shown), for example, bleed air from upstream of the aircraft engine compressor or from various stages of the aircraft engine compressor. The ECS 10 also includes a ram air duct 14, which intakes ram (outside or ambient) air. The ram air provides cooling to the heat exchanger 12. The ECS also includes a water extractor 16.

The water extractor 16 dehumidifies (extracts water from) the bleed air, and collects the water. The water is then sent to the cold circuit of the heat exchanger 12 via one or more spray nozzles 18 in the ram air duct 14. Specifically, the spray nozzle 18 is located in an inlet header 20 of the ram air duct 14. The spray nozzle 18 releases water droplets into the ram air duct 14, and the water droplets evaporate. This evaporation provides additional cooling to the heat exchanger 12. The spray nozzle 18 is a separate part that is bolted onto or otherwise attached to the ram inlet header 20.

Figure 2:
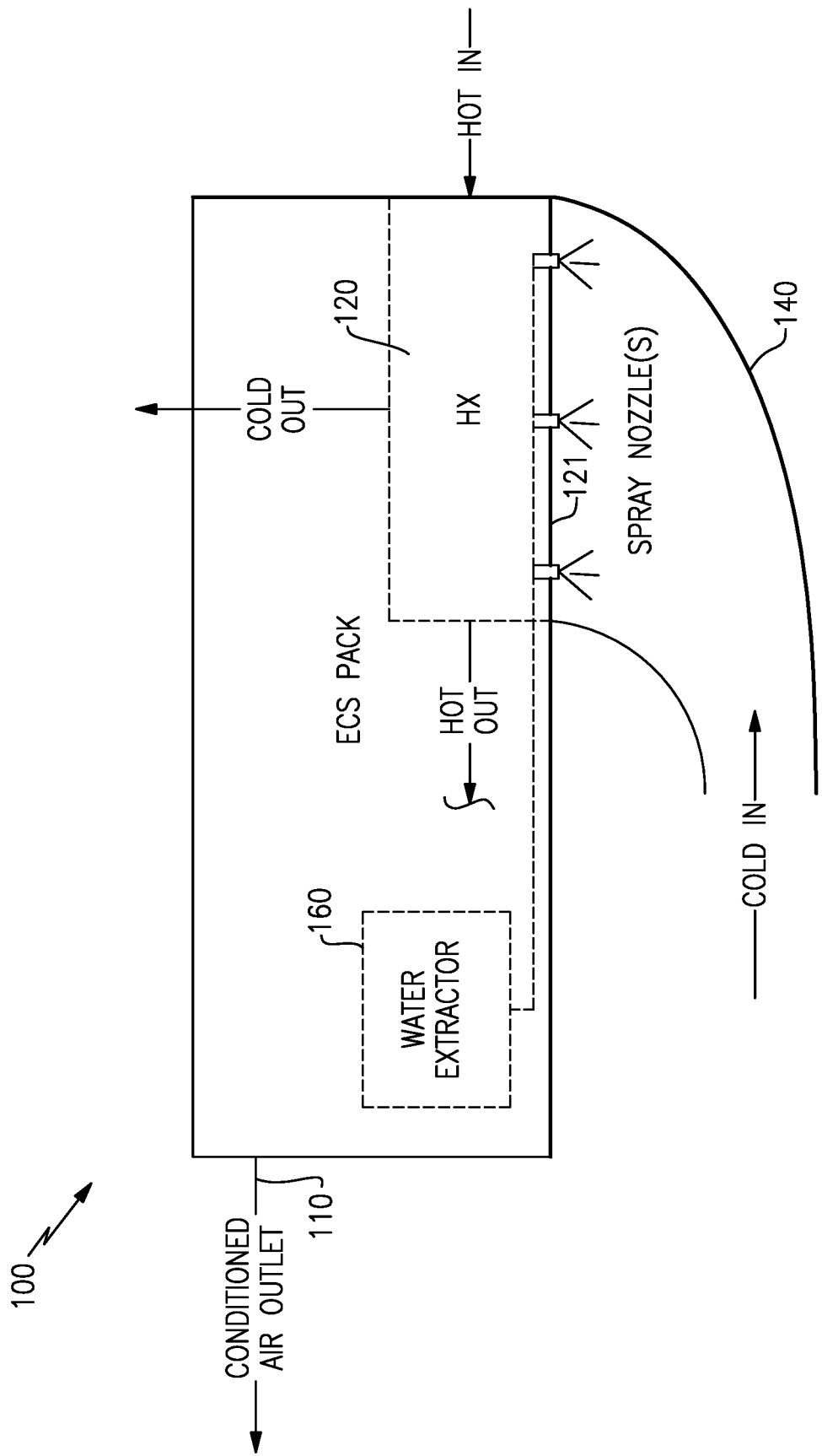
FIG. 2 schematically illustrates an environmental control system (ECS) according to the present disclosure.

Referring now to FIG. 2, an ECS 100 according to the present disclosure is schematically shown. The ECS 100 provides conditioned air at a desired temperature and pressure to an aircraft cabin via a conditioned air outlet 110. The ECS 100 includes a heat exchanger 120, which receives hot air and cools the hot air. The hot air can be bleed air from an aircraft engine (not shown), for example, bleed air from upstream of the aircraft engine compressor or from various stages of the aircraft engine compressor. In one example, the heat exchanger 120 is a plate and fin heat exchanger, but other heat exchanger geometries and types are contemplated.

The ECS 100 also includes a ram air duct 140, which intakes ram (outside or ambient) air. The ram air provides cooling to the heat exchanger 120. The heat exchanger 120 has a cold side 121, which faces the ram air duct 140. The ECS also includes a water extractor 160. The water extractor 160 dehumidifies (extracts water from) the bleed air, and collects the water. The water is then provided to one or more nozzles 180 in the heat exchanger 100, as is described in more detail below with reference to FIGS. 3-6.

FIGS. 3-6 schematically show the heat exchanger 120. The heat exchanger 120 includes an integral pipe 165 which is in fluid communication with the water extractor 160 via a fitting 170. The pipe is arranged along the cold side 121 of the heat exchanger 120, within the volume of the heat exchanger 120. Nozzles 180 are arranged along the pipe 165 and extend from the pipe 160 (e.g., the interior of heat exchanger 120) through the cold side 121, with an orifice 190 exterior to the heat exchanger 120. Nozzles 180 spray water droplets to an exterior of the cold side 121 of the heat exchanger 120, into the ram air duct 140, where the droplets evaporate. This evaporation provides additional cooling to the heat exchanger 120.

In one example, the nozzles 180 and pipe 165 are integral with the heat exchanger 110. That is, the heat exchanger 120, nozzles 180, and pipe 165 are a unitary structure. For instance, the heat exchanger 120 is manufactured such that the nozzles 180 and pipe 165 are manufactured integrally into the heat exchanger 120 as it is being formed. In a particular example, the heat exchanger 120 and integral nozzles 180 and pipe 165 are made by any known additive manufacturing method. Additively manufacturing the heat exchanger 120 in this manner allows for placement of nozzles 180 and pipe 165 in any desired location of the heat exchanger 120, including locations which may otherwise be difficult to attach a nozzle 120. Accordingly, additively manufacturing the heat exchanger 120 increases design flexibility. In turn, the increase of design flexibility allows for more precise and thus more efficient nozzle 180 placement, for example, according to computational fluid dynamics (CFD) analysis, discussed below. This increases the overall efficiency of the ECS 100. Furthermore, because nozzles 180 are integral with the heat exchanger 120, the need for separate mounting details and line-replaceable units (LRUs) is eliminated.

Figure 3:
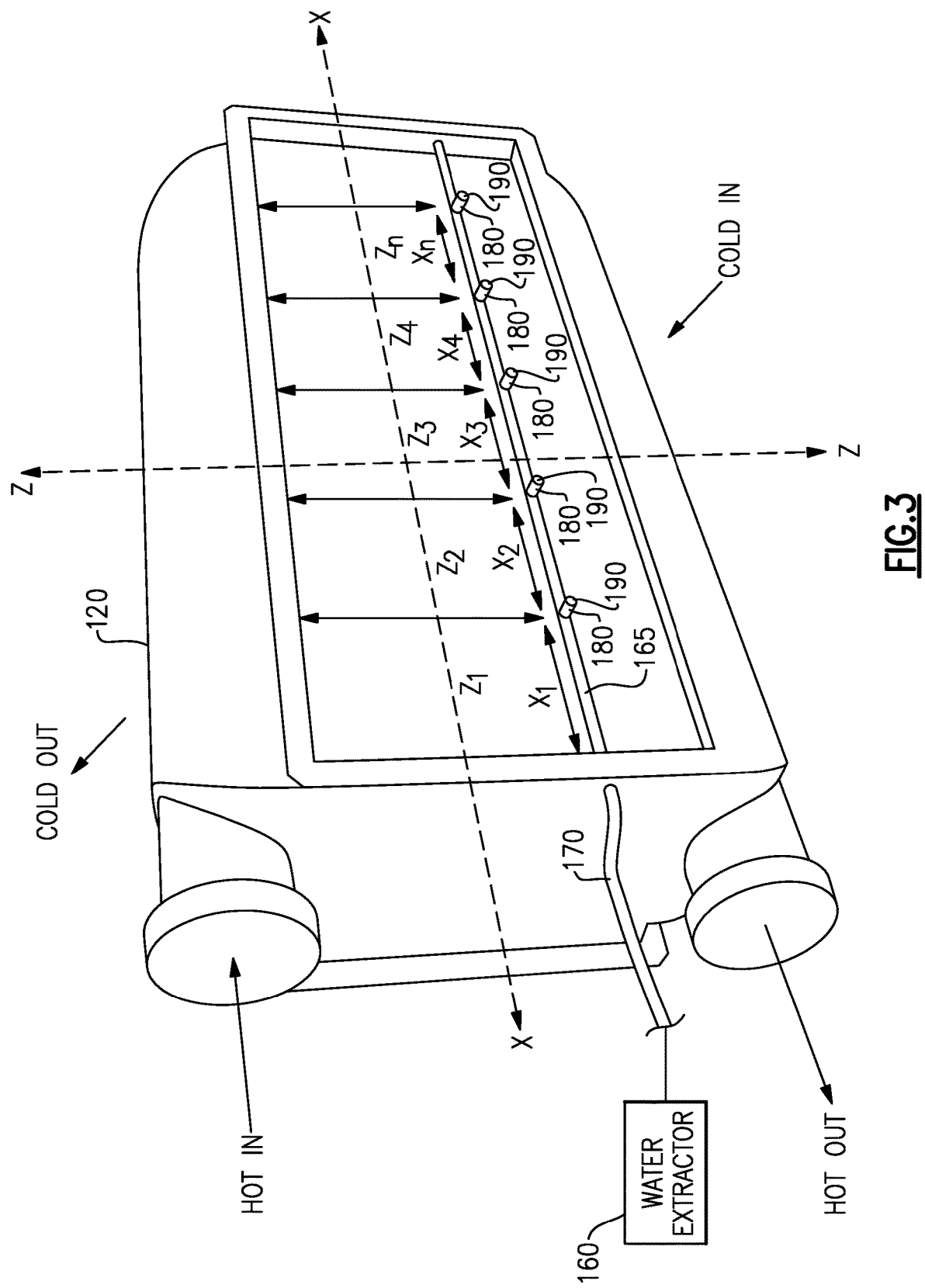
FIG. 3 schematically illustrates an isometric view of a heat exchanger of the ECS of FIG. 2.
Figure 4:
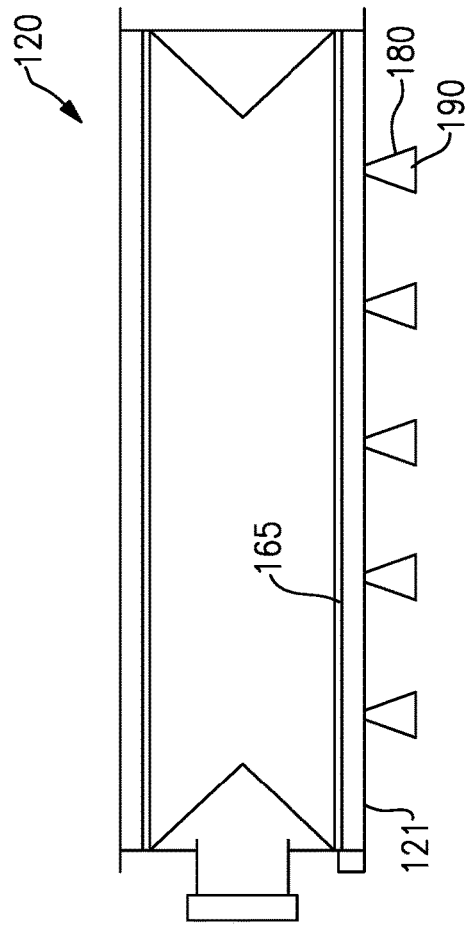
FIG. 4 schematically illustrates a top-down orthogonal view of the heat exchanger of FIG. 3.
Figure 6:
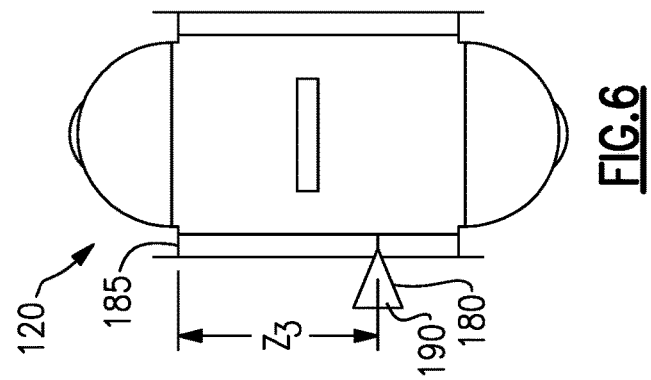
FIG. 6 schematically illustrates a cutaway view of the heat exchanger of FIGS. 3-5 along the section A-A (FIG. 3).
Figure 5:
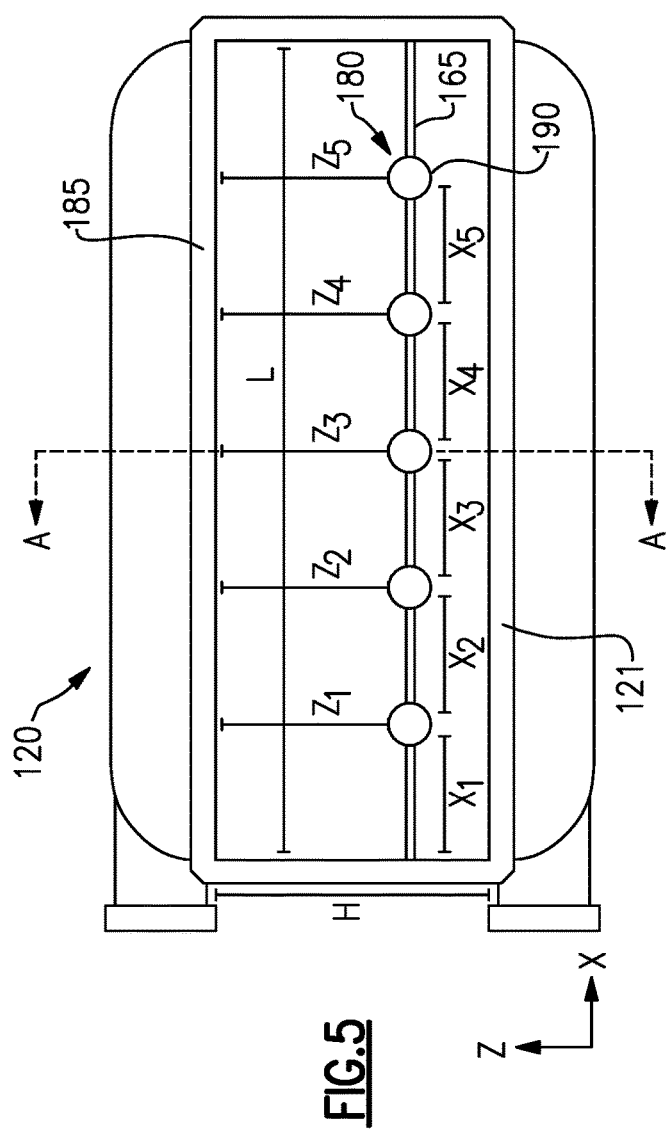
FIG. 5 schematically illustrates side view of the heat exchanger of FIGS. 3-4.

In the example of FIGS. 3-6, five nozzles 180 are shown. However, in other examples, any number of nozzles 180 can be used. Furthermore, in the example of FIGS. 3-6, the pipe 165 is straight such that the nozzles 180 are in a straight line parallel to the X axis. As shown in FIG. 3, the nozzles 180 are located along X and Z axes of the heat exchanger 120. The location of the first nozzle corresponds to a displacement $X_1$ along the X axis and the displacement $Z_1$ along the Z axis, the location of the second corresponds to a displacement $X_2$ along the X axis and the displacement $Z_2$ along the Z axis, and so on. The location of the last nozzle corresponds to a displacement $X_n$ along the X axis and the displacement $Z_n$ along the Z axis, where n is the number of nozzles. The nozzles can be staggered with respect to one another, or located along a line angled with respect to one or both of the X and Z axes, or located in another arrangement. In the example of FIGS. 3-6, the nozzles are equidistant from one another (that is, $X_1=X_2=X_n$) and from a top edge 185 of the cold side 121 (that is, $Z_1=Z_2=Z_n$). In other examples, the X and Z displacements vary.

As shown in FIG. 3, the heat exchanger 120 has a length L along the X axis and a height H along the Z axis. In a particular example, the heat exchanger 120 has a length L of 35.8 inches (90.9 cm), and the heat exchanger 120 has five nozzles 180 spaced equidistant along the cold side 121 such that $X_1=X_2=X_3=X_4=X_5=5.9$ inches (15 cm). The nozzles 180 are each arranged 8.5 inches (21.6 cm) from the top edge 185 of the cold side 121 of the heat exchanger 120 ($Z_1=Z_2=Z_3=Z_4=Z_5=8.5$).

The particular location of each nozzle 180 is selected to maximize cooling efficiency of the heat exchanger 120. This in turn depends on the particular flow pattern of ram air passing by the cold side 121 of the heat exchanger 120. In one example, computational fluid dynamics (CFD) analysis is performed to determine the optimal nozzle 180 locations. In a particular example, the CFD analysis is performed when the ram air duct 140 is open, which occurs at ground conditions for the aircraft. Generally, locating nozzles 180 closer to the hot outlet ("Hot out") of the heat exchanger 120 improves cooling. This allows water spray to be precisely positioned within the ECS 100 to achieve optimal subcooling performance.

The number of nozzles 180 depends on the amount of and pressure of water in the water extractor 160 and fitting 170. The nozzles 180 can be any type of nozzle, such as a fixed orifice nozzle. Another type of nozzle is a pintle nozzle, which produces a more atomized water spray. In one example, the nozzles 180 have orifices 190 with diameters between about 60 and 120 mils (1.524 and 3.048 mm). Each nozzle 180 can have the same design and orifice diameter, or different design and orifice diameter.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An environmental control system, comprising:
   a heat exchanger;
   a ram air duct operable to provide cooling ram air to the heat exchanger; and
   a water extractor operable to extract water from a bleed air stream;
   wherein the heat exchanger includes at least one nozzle operable to spray water from the water extractor into the ram air duct, the at least one nozzle arranged along a pipe in fluid communication with the water extractor, wherein the pipe is located along a cold side of the heat exchanger, the cold side of the heat exchanger facing the ram air duct, and wherein the pipe is inside the heat exchanger.

2. The environmental control system of claim 1, wherein the at least one nozzle extends from the pipe through the cold side of the heat exchanger.

3. The environmental control system of claim 2, wherein the at least one nozzle includes an orifice for spraying the water, and the orifice is exterior to the heat exchanger.

4. The environmental control system of claim 1, wherein the at least one nozzle comprises a plurality of nozzles, and the plurality of nozzles are equidistant from one another.

5. The environmental control system of claim 1, wherein the at least one nozzle comprises a plurality of nozzles, and the plurality of nozzles are equidistant from a top edge of the cold side of the heat exchanger.

6. The environmental control system of claim 1, wherein the at least one nozzle comprises a plurality of nozzles, and the plurality of nozzles are arranged in a straight line.

7. The environmental control system of claim 1, wherein the heat exchanger is operable to provide conditioned air for an aircraft cabin.

8. The environmental control system of claim 1, wherein the heat exchanger is a plate-and-fin heat exchanger.

9. The environmental control system of claim 1, wherein the at least one nozzle is one of a fixed orifice nozzle and a pintle nozzle.

* * * * *